United States Patent [19]

Shimazu

[11] Patent Number: 4,860,928

[45] Date of Patent: Aug. 29, 1989

[54] POWDER CONSTANT-VOLUME FEEDER

[76] Inventor: Tadahiro Shimazu, 1, Konohama-cho, 1 chome, Gifu-City, Japan, 500

[21] Appl. No.: 137,766

[22] Filed: Dec. 24, 1987

[30] Foreign Application Priority Data

Dec. 24, 1986 [JP] Japan .................................. 61-314494
Dec. 1, 1987 [JP] Japan .................................. 62-304892

[51] Int. Cl.⁴ ............................................. B65G 53/08
[52] U.S. Cl. .................................... 222/167; 222/254; 222/630; 222/412; 406/56
[58] Field of Search ....................... 222/167, 168.5, 170, 222/367, 405, 411, 412, 413, 410, 630, 254, 169; 453/49, 57; 221/167; 406/62, 63, 68, 55, 56, 52, 53; 198/658

[56] References Cited

U.S. PATENT DOCUMENTS

| 961,020 | 6/1910 | Robinson | 222/413 X |
| 3,319,825 | 5/1967 | Dore | 222/413 X |
| 4,128,191 | 12/1978 | Frase et al. | 222/167 |
| 4,744,493 | 5/1988 | Ikesue et al. | 222/167 |

FOREIGN PATENT DOCUMENTS

| 73087 | 1/1894 | Fed. Rep. of Germany | 222/169 |
| 2456158 | 6/1975 | Fed. Rep. of Germany | 198/658 |
| 128088 | 6/1919 | United Kingdom | 222/170 |

Primary Examiner—Kevin P. Shaver
Assistant Examiner—Nils E. Pedersen
Attorney, Agent, or Firm—Gaston & Snow

[57] ABSTRACT

A powder constant-volume feeder includes a canister having on the inner surface thereof a fin for transferring powder upwards and is inclined to form a return portion for the powder which has been transferred by the fin. A bucket wheel has a plurality of buckets for continuously transferring the powder from the interior of the return portion to a powder hopper. The powder hopper receives the powder from the interior of the buckets of the bucket wheel. A constant volume of powder can thus be fed continously at a constant bulk density.

7 Claims, 5 Drawing Sheets

POWDER CONSTANT-VOLUME FEEDER

BACKGROUND OF THE INVENTION

1. Field of the Invention

The present invention relates to a powder constant-volume feeder and more particularly to a powder constant-volume feeder especially suitable for feeding powders of metals, ceramics or plastic polymers such as borides, silicides, intermetallic compounds, or complexes, as flame spraying materials, to a plasma spray gun continuously in a constant volume while controlling the bulk density to a constant level.

2. Prior Art

Heretofore, it has been extremely difficult to feed powders of metals or ceramics as spraying materials in a constant volume while controlling their bulk density to a constant level, because those powders are extremely fine, ranging in diameter from 1 to 200 $\mu$m.

Generally, there is known a powder feeder of a structure provided with a powder storing hopper, in which powder is allowed to drop from the hopper. According to this conventional structure, however, the powder is deposited in the opening of the hopper, causing unevenness in the dropping of the powder from the hopper, or a change in the storage condition of the powder in the hopper causes constant variations in bulk density of the powder, so it has been difficult to feed powder in a constant volume.

For example, in "Powder Bulk Handling Technique" edited by Corporation Japan Powder Industrial Technology Association (1985) there are introduced a belt feeder, a chain feeder, a screw feeder, and a table feeder, as feeders capable of being utilized in constant-volume feed. In all these feeders, however, the powder bulk density varies according to changes in the amount of powder charged into the hopper, so there still has been a problem in constant-volume feed of powder. In other words, since the bulk density of powder charged into the hopper changes under the influence of the own weight of the powder, it has been difficult to maintain the powder density at a constant level.

There has also been introduced a powder feeder in which powder particles capable of being maintained at a constant weight even under changes in powder bulk density are detected continuously and the amount of powder to be fed is controlled in accordance with the results of the detection to thereby attain a constant-volume feed of powder. For example, reference is here made to FIG. 9 which is a schematic diagram of a belt scale type continuous constant-weight feeder. As shown in the figure, the weight of powder X discharged from a hopper 100 of this feeder is detected on a belt 101 and on the basis of the detected value there are adjusted the speed of the belt 101 and the degree of opening of an adjusting gate 102 for the outlet of the hopper 100 to thereby feed a constant weight of a powder X continuously.

However, such feeder based on the detection of weight involves the problem that the control timing for the powder already fed is delayed because the control is made after the detection. Moreover, the entire apparatus becomes complicated because of additional necessity for the provision of a detector and a controller.

Further, in Japanese Patent Laid Open No. 10324/1982 there is described an apparatus in which a canister having on the inner surface thereof a plurality of rake-up blades and a powder conveyor are combined and the powder in the canister is allowed to drop onto the conveyor by means of the rake-up blades to effect a constant-volume delivery of the powder. However, such conventional apparatus involves the problem that the powder bulk density is not constant, varying in dependence upon the amount of the powder charged into the canister. More particularly, the larger the amount of the powder charged into the canister, the higher the powder bulk density, and vice versa. Therefore, it is difficult to keep the bulk density constant. Further, because of the use of a screw feeder as the conveyor, there easily occurs clogging of the passage from the interior of the canister to the exterior thereof with the powder, or defective feed due to wear, thus causing an obstacle to a constant-volume feed of powder.

A powder blender/feeder unit used in a plasma sprayer is described in a catalog, "PRODUCT DATA SHEET" No. PF-500-2, published by Dresser Co., an American company. However, the structure of this unit is the same as that described in Japanese Patent Laid Open No. 10324/1982; that is, it is difficult to feed a constant volume of powder continuously while controlling its bulk density to a constant level.

Thus, in the conventional powder feeders for a constant-volume feed of powder, there is a problem in point of variations in the powder bulk density caused by changes in the amount of powder charged, and a problem is also found in the powder conveying path. These problems have been an obstacle to the attainment of a constant-volume feed of powder.

SUMMARY OF THE INVENTION

The present invention has been accomplished in view of such circumstances and it is the object thereof to provide a powder constant-volume feeder of a simple structure capable of preventing the variation of the powder bulk density caused by a change in the amount of powder charged and attaining a continuous feed of powder at a constant bulk density in a constant volume.

The powder constant-volume feeder of the present invention is characterized by including a canister which has on the inner surface thereof a fin for transferring powder upwards and which is inclined to form a return portion for the powder transferred by the fin; a bucket wheel having a plurality of buckets for transferring the powder from the interior of the return portion to a powder hopper continuously; and the powder hopper for receiving therein the powder from the interior of the bucket of the bucket wheel.

The powder constant-volume feeder of the present invention operates so that the powder return portion formed by the inclination of the canister allows the surplus of the powder transferred by the fin to be returned and adjustment is made to maintain the powder in the return portion always at a constant bulk density while blending it with gas. Consequently, powder of a constant bulk density is received in the plural buckets of the bucket wheel which is positioned within the return portion. Further, the powder portions received in the plural buckets of the bucket wheel are transferred successively to the powder hopper in a continuous state, thus permitting a constant-volume feed of the powder. By the term "inclination" is meant an inclination from the horizontal state and by the term "constant volume" is meant that the bulk density and volume of powder are constant.

Figure 1:
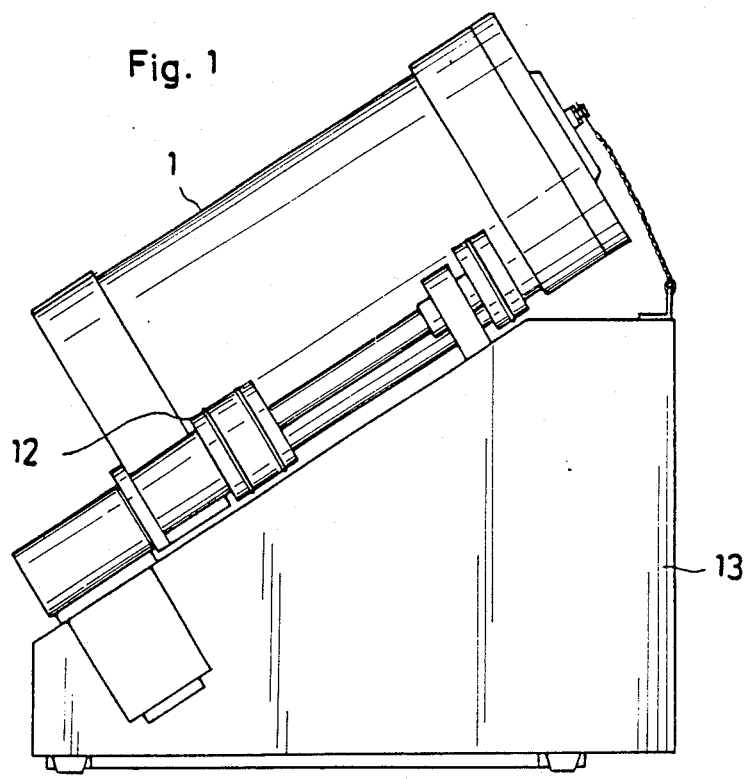
FIG. 1 is a side view of a powder constant-volume feeder according to an embodiment of the present invention.

The present invention will be described in detail hereinunder on the basis of embodiments thereof illustrated in the drawings. The drawings show powder constant-volume feeders applied to a plasma sprayer.

Figure 2:
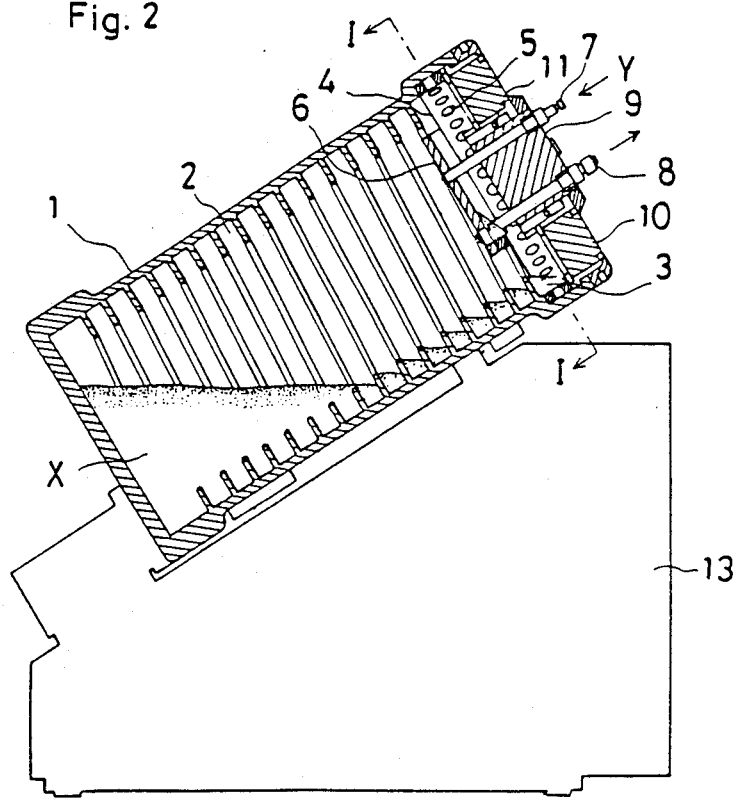
FIG. 2 is a partially sectional view of FIG. 1.
Figure 3:
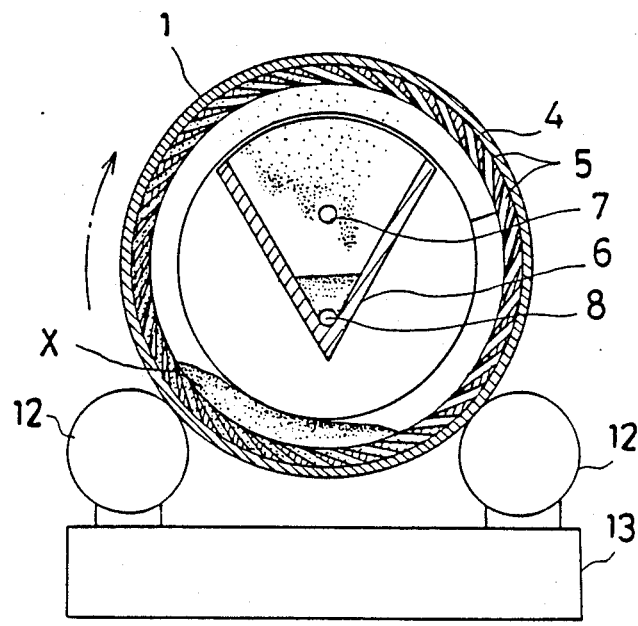
FIG. 3 is a sectional view taken on line I—I of FIG. 2.

FIGS. 1 to 3 illustrate an embodiment of the present invention, or which FIG. 1 is a side view of the whole of an apparatus embodying the invention, FIG. 2 is a sectional view showing the interior of a canister, and FIG. 3 is a sectional view taken on line I—I of FIG. 2.

In the drawings, the reference numeral 1 denotes a canister, which is a vessel receiving powder X therein. The canister 1 is made of aluminum, steel, plastic, or any other material capable of forming the shape of a vessel. But, since the canister 1 is rotated to agitate the interior powder or mix plural kinds of powders X, it is preferable that the canister 1 be made of a material which is not charged with electricity even under friction with the powder or powders X, with aluminum being preferred. Moreover, in order to improve the slipping of the powder X with rotation, it is desirable that the canister 1 be coated with fluorine on the inner peripheral surface thereof. Although the canister 1 is in the form of a cylindrical vessel in this embodiment, it may be prismatic.

The canister 1 is mounted inclinedly on a base 13. It is rotated forward and reverse by means of two rollers 12 which support the canister. As a drive source for this rotation there may be used one capable of controlling the speed of the rotation, e.g. DC servomotor.

Figure 4:
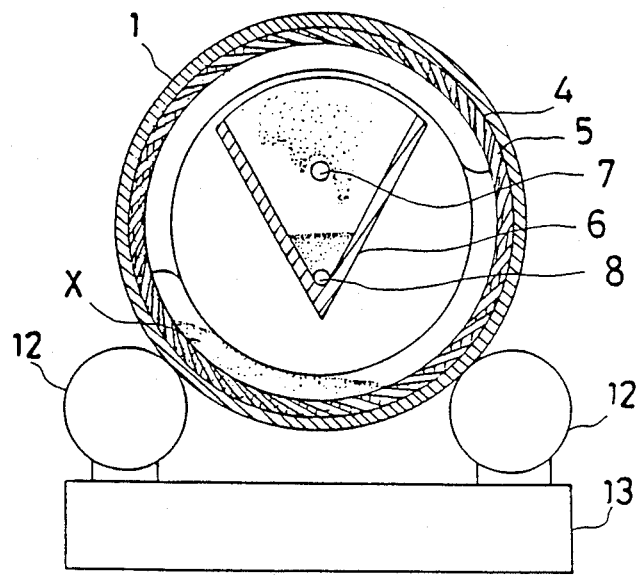
FIG. 4 is a sectional view corresponding to FIG. 3, showing a powder constant-volume feeder according to another embodiment of the present invention.

On the inner surface of the canister 1 is formed a spiral fin 2 which forms a thread groove. The fin 2 is formed so as to describe a spiral toward a later-described bucket wheel 4 in a clockwise direction viewed from the bucket wheel. By means of the fin 2, the powder X in the canister 1 is transferred upwards while being mixed with gas with rotation of the canister. The fin 2 is formed of the same material as that of the canister 1. As to the shape of the fin 2, the fin may have one or more terminal ends. But, shown in FIG. 4, if the fin 2 has two or more terminal ends, that is, if it is a multiple thread type, a continuous transfer of the powder X can be expected.

The fin 2 is not limited to a spiral one. It may be of any other shape if only the powder X in the canister 1 is transferred upwards.

The bucket wheel 4, which is ring-like, is attached to the inner peripheral surface of the canister 1 integrally with the canister and adjacently to the terminal ends of the fin 2. It has a plurality of bucket 5 as recesses formed in the inner surface thereof. Portions of the powder are received in the buckets each in a predetermined certain quantity.

The bucket wheel is preferably mounted so that when it is mounted integrally with the canister 1, its inner surface and the inner peripheral surface of the canister 1 with the fin 2 provided thereon are flush with each other, that is, the bucket wheel 4 is positioned on the same plane as the groove formed by the fin 2, whereby the powder X which has been moved upwards by the fin 2 can be transferred smoothly into the buckets 5.

The bucket wheel rotates in the same manner as the canister 1, thereby allowing the powder received in the buckets 5 to be dropped gradually into a powder hopper 6. Consequently, the powder X can transferred into the powder hopper 6 successively in a continuous state. Also during this transfer operation there is effected mixing of the powder X with gas.

Figure 5:
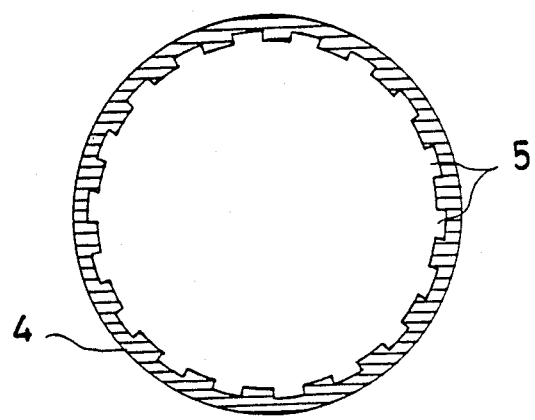
FIGS. 5 and 6 are sectional views showing different examples of bucket wheels.
Figure 6:
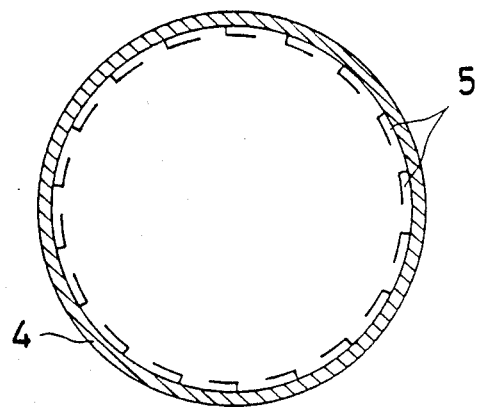

In the above embodiment the openings of the recesses serving as the buckets 5 face in the rotating direction of the bucket wheel 4 and those recesses comprise holes formed by punching in a substantially tangential direction of the bucket wheel 4. They are formed so that the powder X in each bucket 5 is not discharged in a certain rotational angle range. The shape of the buckets 5 is not limited to the one adopted in the above embodiment. There may be adopted any shape if only the powder can be transferred into the powder hopper 6. For example, as shown in FIG. 5, the inner surface of the bucket wheel 4 may be made uneven and the concaves thus formed may be used as the buckets 5 to receive the powder X therein. Or, shown in FIG. 6, a large number of pockets having L-shaped section may be provided along the inner surface of the bucket wheel 4 to receive the powder X therein. Thus, the shape of the buckets 5 is not specially limited if on it permits transfer of the powder up to the powder hopper. The bucket wheel 4 is also formed of the same material as that of the canister 1 and fin 2.

The "plural" of the plural buckets 5 indicates the number of buckets which permit continuous transfer of the powder X to the powder hopper 6. It is also determined by the relation of the bucket wheel 4 to the rotation speed.

The powder hopper 6 is formed in the shape of a fan which is open upwards at a predetermined angle and it functions to receive the powder X in the buckets 5 which have been transferred by the bucket wheel 4. The powder hopper 6 is provided in a upper position with an inlet pipe 7 for the introduction of gas Y and also provided in a lower position with an outlet pipe 8 for the discharge of the powder X. The powder X which has been conveyed by the bucket wheel 4 is received in the powder hopper 6 and then transferred to the exterior successively from the output pipe 8 together with the gas Y which has been introduced from the inlet pipe 7.

A cover 10 is attached to the upper opening of the canister 1 and a retainer 9 which holds the inlet pipe 7 and outlet pipe 8 pipe 8 for the gas Y is fitted in the central part of the cover 10 and is hermetically sealed by a gas seal, thereby permitting mixing of the powder X in the canister 1 with the gas Y introduced from the inlet pipe 7. The retainer 9 has a bearing structure with balls 11 inserted between it and the cover 10, whereby it is held in a stationary state even when the canister 1 rotates.

Figure 7:
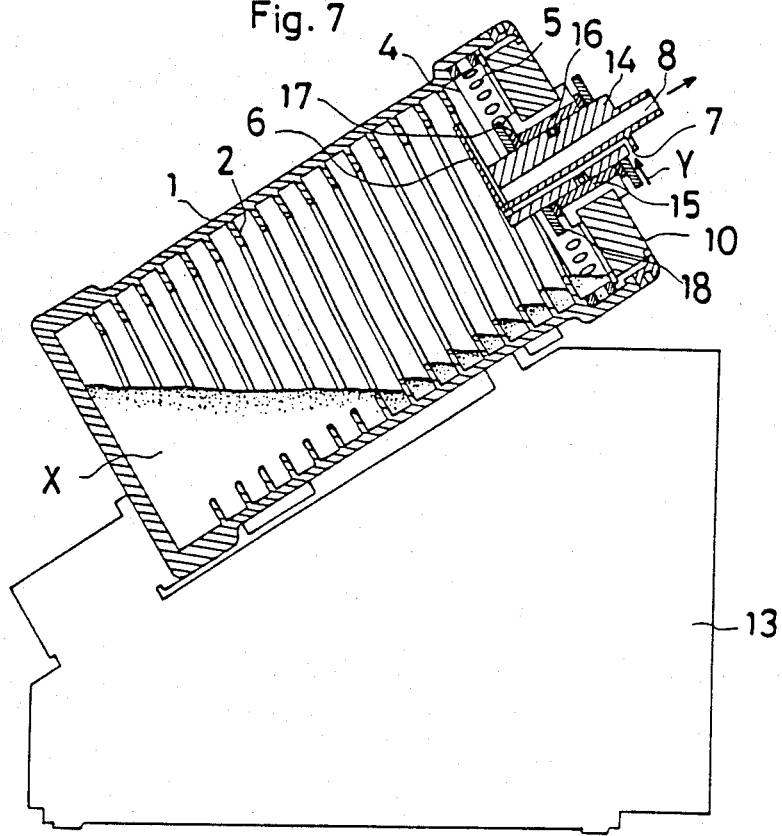
FIG. 7 is a partially sectional view corresponding to FIG. 2, showing a powder constant-volume feeder according to a further embodiment of the present invention.

FIG. 7 illustrates another embodiment having a different bearing structure, in which both inlet and outlet pipes 7 and 8 for the gas Y extend through a single shaft 14. The shaft 14 is inserted into a cylindrical bearing 15 in a state of close contact, the bearing 15 being attached to the cover 10. This bearing is formed of Teflon. An O-ring 16 is fitted in a middle part of shaft 14 and on each end portion of the same shaft are mounted a dust seal 17 made of rubber and a side seal as a presser position outside the dust seal 17.

Figure 8:
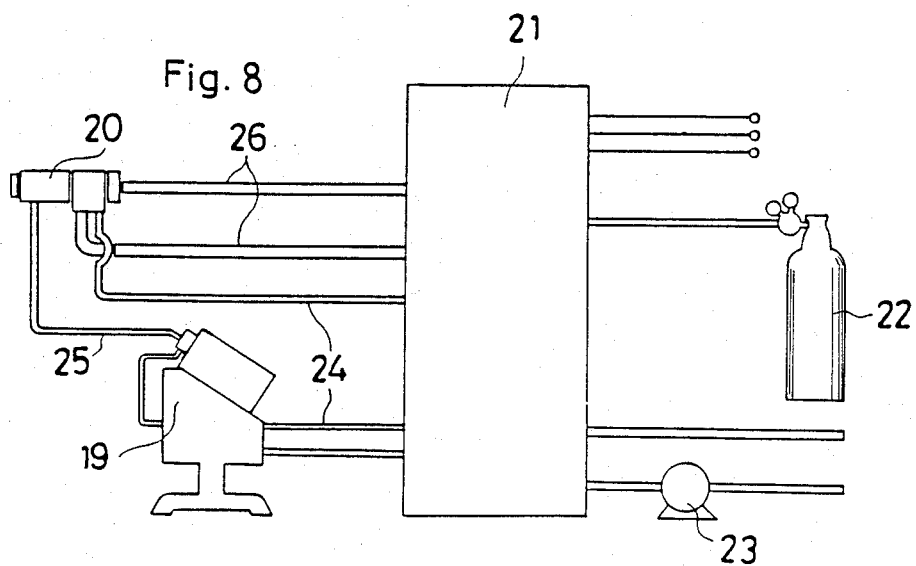
FIG. 8 is a flowchart showing an outline of a plasma sprayer.
Figure 9:
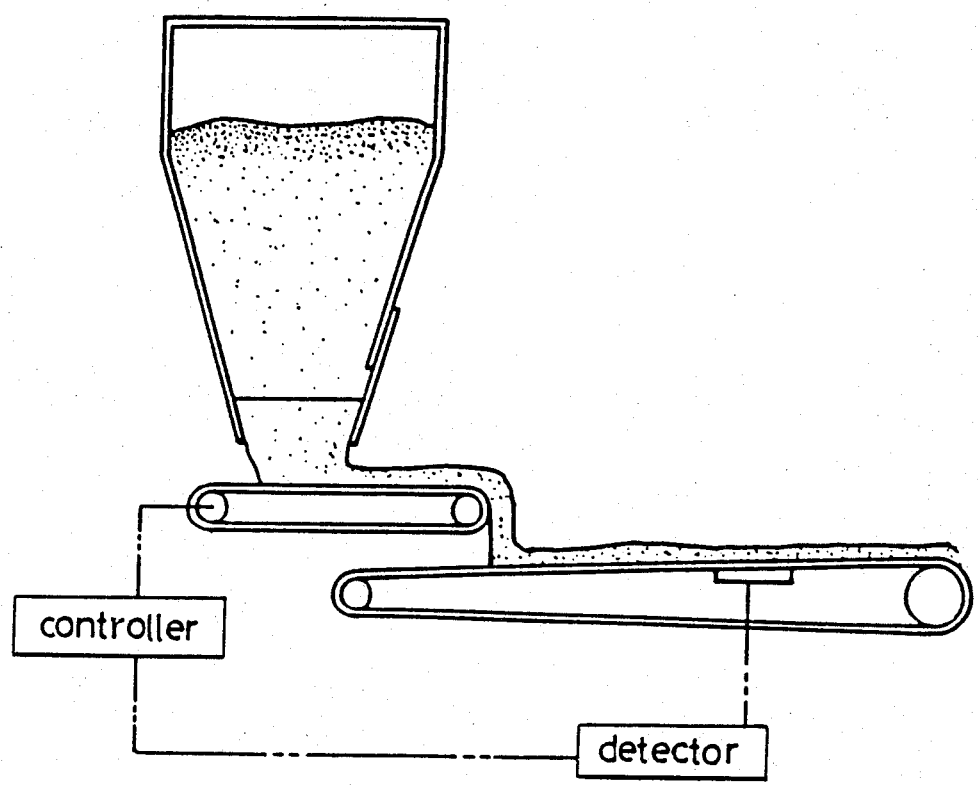
FIG. 9 is a sectional view showing an outline of a belt scale type continuous constant-weight feeder.

The powder constant-volume feeder constructed as above is position in such a flowchart of the entire plasma sprayer as shown in FIG. 8. More specifically, the powder constant-volume feeder, indicated at 19, is positioned between a plasma spray gun 20 and a plasma spray power source 21. The numeral 22 in FIG. 8 denotes a gas cylinder for supply the gas Y which carries the powder Y and the numeral 23 denotes a pump for the delive of water to cool the plasma spray gun 20. Further, the numerals 24, 25 and 26 denote a gas cable, a powder cable and a water-cooling cable, respectively.

Now, the operation of the powder constant-volume feeder will be explained below.

First, when the canister 1 is mounted inclinedly as shown in FIG. 2 and is rotated in the direction of arrow in FIG. 3, the powder X received in the bottom portion of the canister 1 is pushed by the fin 2 and is gradually transferred to the upper terminal end of the fin against the inclination of the canister 1.

In the return portion 3, the powder X thus transferred to the upper terminal end of the fin 2 assumes the state of being returned toward the bottom portion of the canister 1 because the canister is inclined. Thus, due to the inclination of the canister 1, when the amount of the powder X which has been transferred upwards by the fin 2 exceeds a certain level, the powder gets over the fin 2 and is returned. Consequently, a constant amount of powder X having a constant bulk density is always present in the return portion 3. Besides, since the powder X in the return portion 3 is always in a fluid state, it is in a homogenized condition with a moderate amount of gas incorporated therein.

Thus, the powder return portion 3 affords the powder X having a constant bulk density. According to the results of tests made by the present inventor, it is suitable that the angle of inclination of the canister 1 be 32 degrees in view of the relation between the transfer of the powder X by the fin 2 and the amount of the powder X received in the canister. Of course, the angle of inclination of the canister 1 in the powder constant-volume feeder of the present invention is not limited to the said value. If the inclination angle of the canister 1 is set large to a vertical extent a larger amount of the powder X can be received in the canister, but the amount of the powder X transferred by the fin 2 becomes smaller. Converse if the inclination angle of the canister 1 is set small to a horizontal extent, the amount of the powder X transferred by the fin 2 becomes larger, but that of the powder X received into the canister becomes smaller. This point should be considered in setting the inclination angle of the canister 1. The amount of the powder X to be transferred can be adjusted by changing the rotational speed of the canister.

In this way the powder X held at a certain bulk density in the return portion 3 is received in the buckets 5 of the bucket wheel 4 which is positioned in the return portion 3, and then fed to the powder hopper 6 in constant volume. In this case, the amount of the powder X transferred upwards by the fin 2 is set larger than that of the powder X transferred by the bucket wheel 4.

Then, the powder X thus fed to the powder hopper 6 is transferred successively to the exterior through the outlet pipe 8 together with the gas Y which has been introduced from the inlet pipe 7, whereby the powder carrying gas Y and the powder X are held in a good mixed condition at a certain bulk density and fed to the plasma spray gun 20 constantly. Consequently, it is possible to form a coating which is uniform and has high quality.

If it should become impossible for the powder X to be transferred to the exterior for some reason or other, excess powder X above the certain quantity will overflow from the powder hopper and be returned into the canister 1. Thus, even if the feeder continues operation under the occurrence of such trouble in the transfer of the powder X, it is possible to avoid such a situation as destruction of the apparatus.

Moreover, since this apparatus is of the structure in which the canister 1 is in the form of a cylindrical vessel and mounted on the two rollers 12, it is possible to disengage the canister 1 from the rollers 12 and store it in a separate place. It is also possible to replace it with another canister 1 which contains another kind of powder X.

According to the powder constant-volume feeder of the present invention as set forth hereinabove, since the powder return portion is formed by the inclination of the canister, there is obtained a powder having a constant bulk density. Moreover, the powder is transferred into the powder hopper successively in a continuous state by the plural buckets of the bucket wheel so it is possible to attain a constant-volume feed of the powder.

In the powder constant-volume feeder of the present invention, moreover the amount of the powder in the return portion is adjusted by changing the inclination angle of the canister, whereby the bulk density can be set freely. Further, the amount of powder to be fed can be set in a stepless manner by changing the rotational speed of the canister and that of the bucket wheel.

Moreover, the powder in the return portion can be held at a constant bulk density independently of the amount of powder charged into the canister. Therefore, even if the powder is supplied to the canister intermittently, the constant-volume feed of powder at a constant bulk density will never be affected.

In the powder constant-volume feeder of the present invention, moreover since the agitation of powder can be done by the canister, it is possible to effect mixing of two or more kinds of powders at a time.

Further, the powder constant-volume feeder of the present invention can cope with machine troubles. More particularly, even if the apparatus should continue operation under the occurrence of clogging caused by some trouble or other in the feed of powder, the powder will be returned in the position of the powder hopper of the return portion, so it is possible to avoid overfeed of the powder. On this regard, in the conventional continuous feeder, when trouble occurs, for example, when the feeder continues operation in a powder overfed condition in the preceding portion or in a powder clogg state, if the entire apparatus is not stopped operation immediately, then wear and seizing of the machine, sticking of powder and eventually burning of the motor will result. The apparatus of the present invention will never suffer such a great loss.

The powder constant-volume feeder of the present invention not only can be utilized for a constant-volume feed of powder as a flame spray material but also is useful in powder handling industrial fields such as the food industry including milling, the chemical industry including cement and plastics, as well as the medical industry including medicines and agricultural chemicals.

What is claimed is:

1. A powder constant-volume feeder including:
   a canister having on the inner surface thereof a fin for transferring powder upwards and being inclined to form a return portion for the powder which has been transferred by said fin;
   a bucket wheel having a plurality of buckets for transferring the powder from said return portion to a powder hopper continuously; and
   said powder hopper for receiving therein the powder from the interior of the buckets of said bucket wheel.

2. A powder-constant volume feeder according to claim 1, wherein said canister includes at least one fin.

3. A powder constant-volume feeder according to claim 1, wherein said bucket wheel has an inner surface comprising concaves and convexes, the concaves serving as said buckets.

4. A powder constant-volume feeder according to claim 1, wherein a multitude of pockets of an L-shaped section are provided along the inner surface of said bucket wheel, the pockets serving as said buckets.

5. A powder constant-volume feeder according to claim 1, wherein said powder hopper is provided at the upper portion thereof with a gas inlet pipe and also provided at the lower portion thereof with a gas outlet pipe.

6. A powder constant-volume feeder according to claim 5, wherein said canister has an upper opening which is covered with a cover with a retainer fitted in the central part of said cover and hermetically sealed with a gas seal, said retainer holding both said inlet and outlet pipes.

7. A powder constant-volume feeder according to claim 6, wherein both said inlet and outlet pipes extend through a single shaft.

* * * * *